US011012196B2

(12) United States Patent
Zhou et al.

(10) Patent No.: US 11,012,196 B2
(45) Date of Patent: May 18, 2021

(54) BASE STATIONS, USER EQUIPMENTS AND A SYSTEM FOR WIRELESS COMMUNICATION, AS WELL AS THE CORRESPONDING METHODS

(71) Applicant: Huawei Technologies Co., Ltd., Shenzhen (CN)

(72) Inventors: Chan Zhou, Munich (DE); Alexandros Kaloxylos, Munich (DE); Ramya Panthangi Manjunath, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 16/396,331

(22) Filed: Apr. 26, 2019

(65) Prior Publication Data
US 2019/0253192 A1 Aug. 15, 2019

Related U.S. Application Data

(63) Continuation of application No. PCT/EP2016/076101, filed on Oct. 28, 2016.

(51) Int. Cl.
| | | |
|---|---|---|
| *H04L 1/08* | (2006.01) | |
| *H04L 1/18* | (2006.01) | |
| *H04W 72/04* | (2009.01) | |
| *H04L 1/00* | (2006.01) | |

(52) U.S. Cl.
CPC ............ *H04L 1/08* (2013.01); *H04L 1/1864* (2013.01); *H04L 1/1896* (2013.01);
(Continued)

(58) Field of Classification Search
CPC ....... H04L 1/08; H04L 1/1896; H04L 1/1864; H04L 2001/0097; H04L 2001/0093; H04W 72/0406
(Continued)

(56) References Cited

U.S. PATENT DOCUMENTS

| | | | | |
|---|---|---|---|---|
| 8,135,098 B2 * | 3/2012 | Lee | ........................ | H04L 25/067 |
| | | | | 375/346 |
| 8,472,568 B1 * | 6/2013 | Fattal | .................... | H04L 25/067 |
| | | | | 375/341 |

(Continued)

FOREIGN PATENT DOCUMENTS

| | | |
|---|---|---|
| EP | 2662993 A2 | 11/2013 |
| WO | 2011086236 A1 | 7/2011 |

OTHER PUBLICATIONS

"3rd Generation Partnership Project; Technical Specification Group Radio Access Network; Study on Scenarios and Requirements for Next Generation Access Technologies; (Release 14)," 3GPP TR 38.913 V14.0.0, pp. 1-39, 3rd Generation Partnership Project, Valbonne, France (Oct. 2016).

(Continued)

*Primary Examiner* — James C Kerveros
(74) *Attorney, Agent, or Firm* — Leydig, Voit & Mayer, Ltd.

(57) ABSTRACT

The present disclosure refers to base stations, user equipment and a system for wireless communication, as well as the corresponding wireless communication methods implementing mechanisms enabling fast, reliable and resource efficient retransmissions between a base station and one or a plurality of user equipment. The present disclosure is specifically directed to an uplink unicast case and a downlink multicast case and cooperates a proactive allocation of resources for a retransmission of the initial data in case that the initial data transmission fails, and a new data transmission if the initial data transmission successes.

4 Claims, 10 Drawing Sheets

(52) U.S. Cl.
CPC . *H04W 72/0406* (2013.01); *H04L 2001/0093* (2013.01); *H04L 2001/0097* (2013.01)

(58) Field of Classification Search
USPC ........................................................ 714/748
See application file for complete search history.

(56) References Cited

U.S. PATENT DOCUMENTS

| | | | | |
|---|---|---|---|---|
| 8,649,346 | B2* | 2/2014 | Park | H04W 52/146 370/329 |
| 9,148,253 | B2* | 9/2015 | Cao | H03M 13/095 |
| 2009/0086855 | A1* | 4/2009 | Jin | H04L 1/0009 375/341 |
| 2011/0249630 | A1 | 10/2011 | Kim et al. | |
| 2012/0127949 | A1* | 5/2012 | Yoshimoto | H04L 1/0077 370/329 |
| 2012/0155373 | A1* | 6/2012 | Yokomakura | H04B 7/15521 370/315 |
| 2014/0119249 | A1* | 5/2014 | Park | H04L 5/0055 370/280 |
| 2015/0082133 | A1* | 3/2015 | Cao | H03M 13/612 714/807 |

OTHER PUBLICATIONS

"3rd Generation Partnership Project; Technical Specification Group Radio Access Network; Evolved Universal Terrestrial Radio Access (E-UTRA); Physical layer procedures(Release 14)," 3GPP TS 36.213 V14.0.0, pp. 1-406, 3rd Generation Partnership Project, Valbonne, France (Sep. 2016).

Seppala et al., "Network Controlled Device-to-Device (D2D) and Cluster Multicast Concept for LTE and LTE-A Networks," 2011 IEEE Wireless Communications and Networking Conference, pp. 986-991, Institute of Electrical and Electronics Engineers, New York, New York (May 27, 2011).

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.1.0, pp. 1-98, 3rd Generation Partnership Project, Valbonne, France (Dec. 2016).

"3rd Generation Partnership Project; Technical Specification Group Services and System Aspects; Study on LTE support for Vehicle to Everything (V2X) services(Release 14)," 3GPP TR 22.885 V14.0.0, pp. 1-50, 3rd Generation Partnership Project, Valbonne, France (Dec. 2015).

"3rd Generation Partnership Project; Technical Specification Group Radio Access Network; Evolved Universal Terrestrial Radio Access (E-UTRA); Radio Resource Control (RRC); Protocol specification(Release 14)," 3GPP TS 36.331 V14.0.0, pp. 1-644, 3rd Generation Partnership Project, Valbonne, France (Sep. 2016).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 14)," 3GPP TS 36.300 V14.0.0, pp. 1-314, 3rd Generation Partnership Project, Valbonne, France (Sep. 2016).

* cited by examiner

Sensing before transmission, duration = e.g. 1 symbol

BASE STATIONS, USER EQUIPMENTS AND A SYSTEM FOR WIRELESS COMMUNICATION, AS WELL AS THE CORRESPONDING METHODS

CROSS-REFERENCE TO RELATED APPLICATIONS

This application is a continuation of International Application No. PCT/EP2016/076101, filed on Oct. 28, 2016, the disclosure of which is hereby incorporated by reference in its entirety.

TECHNICAL FIELD

The present disclosure refers to base stations, user equipment and a system for wireless communication, as well as the corresponding wireless communication methods performed by the base stations, the user equipment and the system, respectively.

BACKGROUND

Future generations of wireless communication networks are envisioned to support diverse sets of usage scenarios with varying performance requirements. One such family of usage scenario includes: Ultra-Reliability and Low Latency Communication (URLLC) as in 3GPP TR 38.913. The reliability requirement for URLLC is as stringent as 99.999% with user plane latency of few millisecond as in 3GPP TR 38.913. Reliability here is considered as the success probability of transmitting a certain number of bytes in a certain time duration. Achieving such strict requirements over the unreliable wireless link is a challenge.

One of the ways to improve reliability is by retransmitting the data in case of an erroneous reception. Mechanisms such as Automatic Repeat Request (ARQ) at the RLC layer and Hybrid-ARQ (HARQ) at the media access control (MAC) layer are incorporated in the Long Term Evolution (LTE) standard to detect and correct errors by considering message retransmissions. In the case of erroneous reception of data in ARQ, the data packet is completely discarded, and a new transmission is requested. Whereas in HARQ, Forward Error Correction (FEC) is first applied to correct the errors caused due to the time varying wireless channel. If the decoding is still unsuccessful, retransmission is triggered. Unlike in ARQ, in HARQ the erroneous data is not discarded but buffered at the receiver. Upon receiving the retransmitted data, the newly arrived data is combined with the buffered data to improve the probability of successful decoding. Retransmissions from the sender are triggered based on feedback from the receiver. In LTE 1-bit information, ACK or NACK, transmitted in Physical Hybrid-ARQ Indicator Channel (PHICH) or Physical Uplink Control Channel (PUCCH)/Physical Uplink Shared Channel (PUSCH) for uplink, UL, and downlink, DL, data transmissions respectively indicate the status of message decoding at the receiver as in 3GPP TS 36.213.

The two retransmission mechanisms ARQ and HARQ operate in a hierarchical manner in LTE, that is, the operation of ARQ is triggered after reaching the maximum limit of HARQ retransmissions to correct the residual errors. While these feedback based retransmission schemes improve reliability, this comes at the cost of additional delay and resource utilization. With future wireless networks envisioned to support shorter frame structures, the overall delay could also be linearly reduced; however, this could result in HARQ retransmissions occurring in the same channel conditions.

SUMMARY

An object is to provide a mechanism that is fast and improves the efficiency in terms of resource utilization and probability of successful decoding of the transmissions.

The above-object is achieved by the base stations, user equipment the communication system as well as the corresponding methods defined in the various aspects of the present invention.

Generally, the present disclosure relates to mechanisms to enable fast, reliable and resource efficient retransmissions. The mechanisms are applicable for cellular networks that support direct communication (network assisted) via the direct UE-to-UE link, i.e. sidelink, SL as in 3GPP TS 36.300, as well as communication between the base station and the User Equipment (UE). In the disclosure, two scenarios are considered: Uplink (UL) unicast transmissions and Downlink (DL) multicast transmissions. Considering DL multicast is motivated by the support for vehicle-to-everything (V2X) by Ultra-Reliable Low-Latency Communications (URLLC). For V2X use cases such as Collision Avoidance message from a particular vehicle is generally intended for all its neighboring vehicles as in 3GPP TR 22.885. Such simultaneous message transmissions to multiple recipients would benefit from resource efficiency of multicasting.

For UL scenario, the receiver is a base station capable of receiving simultaneous data transmissions from multiple transmitter devices such as UEs. In the case of DL, the transmitter in the base station that is capable of transmitting data simultaneously to multiple UEs that are capable of communicating with one another directly via sidelink or indirectly through the base station.

According to a first aspect, the present disclosure provides a base station for wireless communication, with
control means adapted to generate control data comprising information about resource allocation for initial data transmission as well as data re-transmission between the base station (BS) and a user equipment (UE) wherein
the control data are designed for an uplink (UL) unicast case, and the information about resource allocation comprises information about UL resources which are allocated by the BS to a user equipment (UE) for an initial transmission of data from the UE to the BS, as well as information about UL resources which are allocated by the BS to said UE for a re-transmission of said data from the UE to the BS, and said BS further comprises transmitting means to transmit said control data to said UE. This enables fast, reliable and resource efficient retransmission in the UL unicast case.

According to a first implementation form of the first aspect of the present disclosure, said control means is further adapted to generate further control data comprising information about resource allocation for data transmission between said UE or another UE and said BS on said UL resources allocated for said re-transmission of data, and to control said transmitting means to transmit said further control data to said UE or to said another UE at the same time as transmitting said control data to said UE, and, in case that said initial transmission of data from said UE to the BS is successful, control said transmitting means to transmit a message to said UE or said another UE that said UL resources allocated for said re-transmission of data can be used for other UL or DL data transmission between said UE or said another UE and said BS.

According to a second aspect, the present disclosure provides a base station for wireless communication, with control means adapted to generate control data comprising information about resource allocation for initial data transmission as well as data re-transmission between the base station (BS) and multiple equipment (UE) wherein the control data are designed for a downlink (DL) multicast case, and the information about resource allocation comprises information about DL resources which are used by the BS for an initial transmission of data to multiple UEs as well as information about DL resources which are used by the BS for a re-transmission of said data to said multiple UEs and information about sidelink, SL, resources which are used by UEs for a forwarding of said data to one or more of said UEs which did not receive said data in the initial transmission, said BS further comprising transmitting means to transmit said control data to said multiple UEs. This enables fast, reliable and resource efficient retransmission in the DL multicast case.

According to a first implementation form of the second aspect of the present disclosure, said control means is further adapted to generate said control data so that said information about said SL resources comprise information about the same SL resources and a same modulation and coding scheme to be used by said UEs for said forwarding of said data.

According to a second implementation form of the second aspect of the present disclosure as such, or according to the first implementation form of the second aspect, said control means is further adapted to generate further control data comprising information about resource allocation for data transmission between said UEs and said BS on said DL resources allocated for said re-transmission of data and information about resource allocation for data transmission between said UEs on said SL resources allocated for said forwarding of said data, and to control said transmitting means to transmit said further control data to said multiple UEs at the same time as transmitting said control data to said multiple UEs, and, in case that said initial transmission of data from said BS to the UEs is successful, control said transmitting means to transmit a message to said multiple UEs that said DL resources allocated for said re-transmission of data and said SL resources allocated for said forwarding of data can be used for other UL, DL or SL data transmission.

According to a third aspect, the present disclosure provides a user equipment for wireless communication, with receiving means adapted to receive, from a base station (BS) control data comprising information about resource allocation for initial data transmission as well as data re-transmission between the BS and said UE, wherein the control data are designed for an uplink (UL) unicast case, and the information about resource allocation comprises information about UL resources which are allocated by the BS to said UE, for an initial transmission of data from said UE to the BS, as well as information about UL resources which are allocated by the BS to said UE for a re-transmission of said data from said UE to the BS, said UE further comprising transmitting means and control means adapted to control said transmitting means adapted to initially transmit said data to said BS in said UL resources allocated for said initial transmission and to re-transmit said data in said UL resources allocated for said re-transmission in case that said initial transmission was not successful. This enables fast, reliable and resource efficient retransmission in the UL unicast case.

According to a first implementation form of the third aspect of the present disclosure, said control means is further adapted to detect if said initial transmission was successful by sensing if said resources allocated by the BS for a re-transmission of said data are being used for other data transmission.

According to a second implementation form of the third aspect of the present disclosure, said control means is further adapted to detect if said initial transmission was successful by receiving an acknowledgement message from said BS in response to a successful initial transmission of said data.

According to a fourth aspect, the present disclosure provides a user equipment for wireless communication, with first receiving means adapted to receive, from a base station (BS) control data comprising information about resource allocation for initial data transmission as well as data re-transmission between the BS and said UE,
wherein the control data are designed for a downlink (DL) multicast case, and the information about resource allocation comprises information about DL resources which are used by the BS for an initial transmission of data to multiple UEs as well as information about DL resources which are used by the BS for a re-transmission of said data to said multiple UEs and information about sidelink (SL) resources which are used by UEs for a forwarding of said data to one or more of said UEs which did not receive said data in the initial transmission, wherein said first receiving means is further adapted to receive said initially transmitted data from said BS in said DL resources allocated for said initial transmission and to receive said re-transmitted data in said DL resources allocated for said re-transmission in case that the receipt of said data of said initial transmission fails,
said UE further comprising second receiving means to receive said data from said UEs in said SL resources allocated for said forwarding in case that the receipt of said data of said initial transmission fails. This enables fast, reliable and resource efficient retransmission in the DL multicast case.

According to a first implementation form of the fourth aspect of the present disclosure, said user equipment further comprises first transmitting means adapted to transmit control data to said BS via UL and second transmitting means adapted to transmit control data to said multiple UEs via SL, and control means adapted to control said first and second transmitting means to transmit, in case that said initial transmission of data to said UE is not successful, messages to trigger said re-transmission of said data to said BS and to trigger forwarding of said data to said other UEs, respectively.

According to a fifth aspect, the present disclosure provides a wireless communication system comprising a base station according to the first aspect or any of its implementation forms and a user equipment according to the third aspect or any of its implementation forms, or a base station according to the second aspect or any of its implementation forms and a user equipment according to the fourth aspect or any of its implementation forms.

According to a sixth aspect, the present disclosure provides a method for wireless communication, performed by a base station (BS) comprising the following steps
generating control data comprising information about resource allocation for initial data transmission as well as data re-transmission between the BS and a user equipment (UE) wherein the control data are designed for an uplink (UL) unicast case, and the information about resource allocation comprises information about UL resources which are allocated by the BS to a user equipment (UE) for an initial transmission of data from the UE to the BS, as well as information about UL resources which are allocated by the BS to said UE for a re-transmission of said data from the UE to the BS, and transmitting said control data to said UE.

Implementation forms of the sixth aspect of the disclosure correspond to the implementation forms of the first aspect of the disclosure, with the functionalities of the entities of the first aspect of the disclosure formulated as method steps.

According to a seventh aspect, the present disclosure provides a method for wireless communication, performed by a base station, BS, comprising the following steps generating control data comprising information about resource allocation for initial data transmission as well as data re-transmission between the base station (BS) and multiple equipment (UEs) wherein the control data are designed for a downlink (DL) multicast case, and the information about resource allocation comprises information about DL resources which are used by the BS for an initial transmission of data to multiple UEs as well as information about DL resources which are used by the BS for a re-transmission of said data to said multiple UEs and information about sidelink (SL) resources which are used by UEs for a forwarding of said data to one or more of said UEs which did not receive said data in the initial transmission, and transmitting said control data to said multiple UEs.

Implementation forms of the seventh aspect of the disclosure correspond to the implementation forms of the second aspect of the disclosure, with the functionalities of the entities of the second aspect formulated as method steps.

According to an eighth aspect, the present disclosure provides a method for wireless communication, performed by a user equipment (UE) comprising the steps of receiving, from a base station (BS) control data comprising information about resource allocation for initial data transmission as well as data re-transmission between the BS and said UE, wherein the control data are designed for an uplink (UL) unicast case, and the information about resource allocation comprises information about UL resources which are allocated by the BS to said UE, for an initial transmission of data from said UE to the BS, as well as information about UL resources which are allocated by the BS to said UE for a re-transmission of said data from said UE to the BS, initially transmitting said data to said BS in said UL resources allocated for said initial transmission and re-transmitting said data in said UL resources allocated for said re-transmission in case that said initial transmission was not successful.

Implementation forms of the eighth aspect of the disclosure correspond to the implementation forms of the third aspect of the disclosure, with the functionalities of the entities of the third aspect formulated as method steps.

According to a ninth aspect, the present disclosure provides a method for wireless communication, performed by a user equipment, comprising the steps receiving, from a base station (BS) control data comprising information about resource allocation for initial data transmission as well as data re-transmission between the BS and said UE, wherein the control data are designed for a downlink (DL) multicast case, and the information about resource allocation comprises information about DL resources which are used by the BS for an initial transmission of data to multiple UEs as well as information about DL resources which are used by the BS for a re-transmission of said data to said multiple UEs and information about sidelink (SL) resources which are used by UEs for a forwarding of said data to one or more of said UEs which did not receive said data in the initial transmission, receiving said initially transmitted data from said BS in said DL resources allocated for said initial transmission, or receiving said re-transmitted data from said BS in said DL resources allocated for said initial transmission and receiving said data from said UEs in said SL resources allocated for said re-transmission in case that the receipt of said data of said initial transmission fails.

Implementation forms of the ninth aspect of the disclosure correspond to the implementation forms of the fourth aspect of the disclosure, with the functionalities of the entities of the fourth aspect formulated as method steps.

A tenth aspect of the disclosure provides a method for wireless communication which corresponds to the fifth aspect of the present disclosure, with the functionalities of the entities of the fifth aspect formulated as method steps.

It has to be noted that all devices, elements, units and means described in the present application can be implemented as software or hardware elements or in any kind of combination thereof. All steps which are performed by the various entities described in the present application as well as the functionalities described to be performed by the various entities are intended to mean the respective entity is adapted to or configured to perform a respective steps and functionalities.

Even if, in the following description of specific embodiments, a specific functionality or step to be performed by an entity is not reflected in the description of a specific detailed element of that entity which performs that specific step or functionality, it is clear for a skilled person that these methods and functionalities can be implemented in respective software or hardware elements, or any kind of combination thereof.

It is further to be understood that all advantages and effects described with respect to a base station and/or a method performed by a base state in the present application identically apply to a corresponding user equipment or method by user equipment, as well as to any communication system comprising such base stations and mobile stations. It is further to be understood that the term base station used in the present application is intended to define parts of base stations or entire base stations which are adapted to perform the defined described functionalities herein. Further, the term user equipment is intended to define any kind of device, apparatus or parts thereof which are adapted to perform the described and defined functionalities in any kind of wireless communication network, including present or future wireless communication networks.

BRIEF DESCRIPTION OF THE DRAWINGS

The present disclosure is explained in further detail on the following detailed description of embodiments in relation to the enclosed drawings, in which FIG. 1 schematically shows an UL scenario, FIG. 2 schematically proactive resource allocation.

DETAILED DESCRIPTION OF EMBODIMENTS

Figure 1:
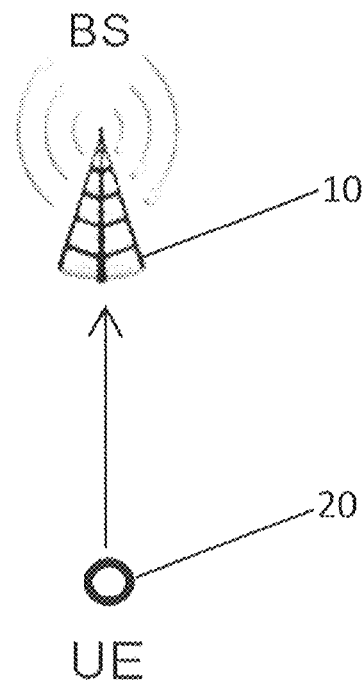
Figure 2:
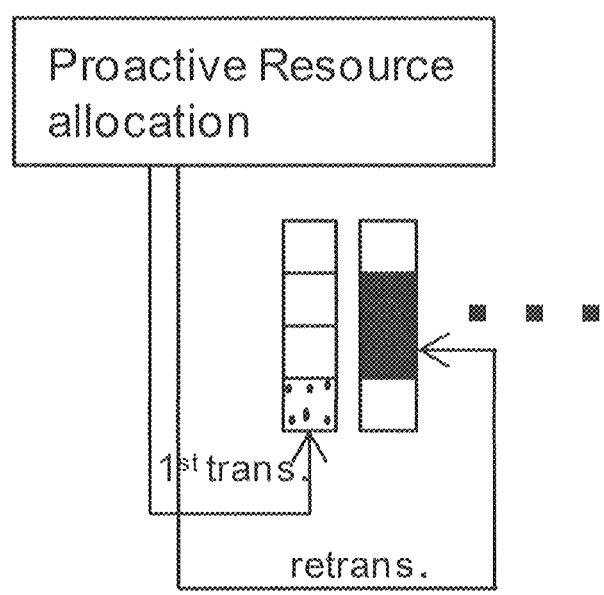
Figure 9:
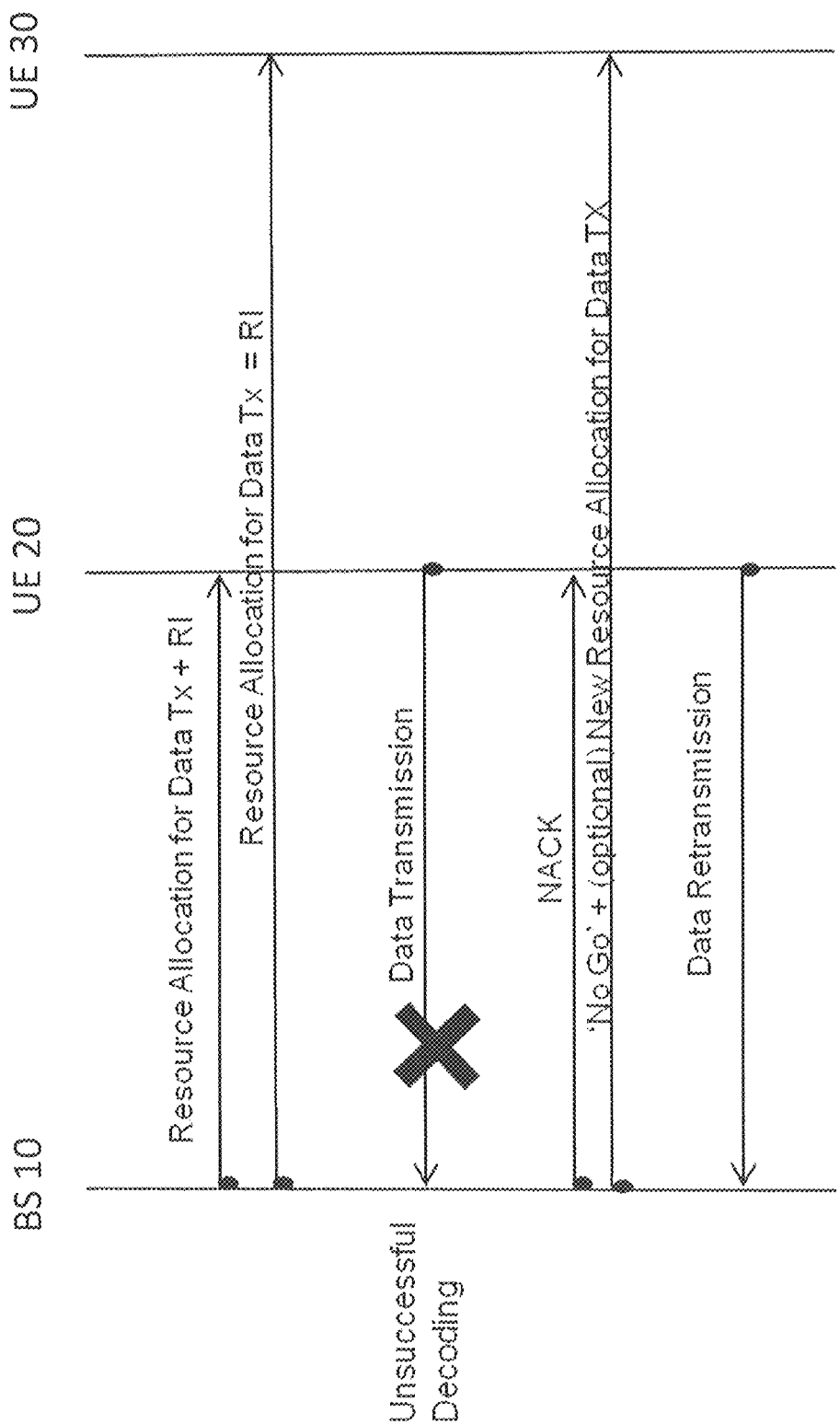
FIG. 9 shows a schematic flowchart of resource utilization for unsuccessful decoding, FIG. 10 schematically shows a DL multicast scenario, FIG. 11(*a*) and FIG. 11(*b*) and FIG. 11(*c*) show different situations of the multicast retransmission.
Figure 10:
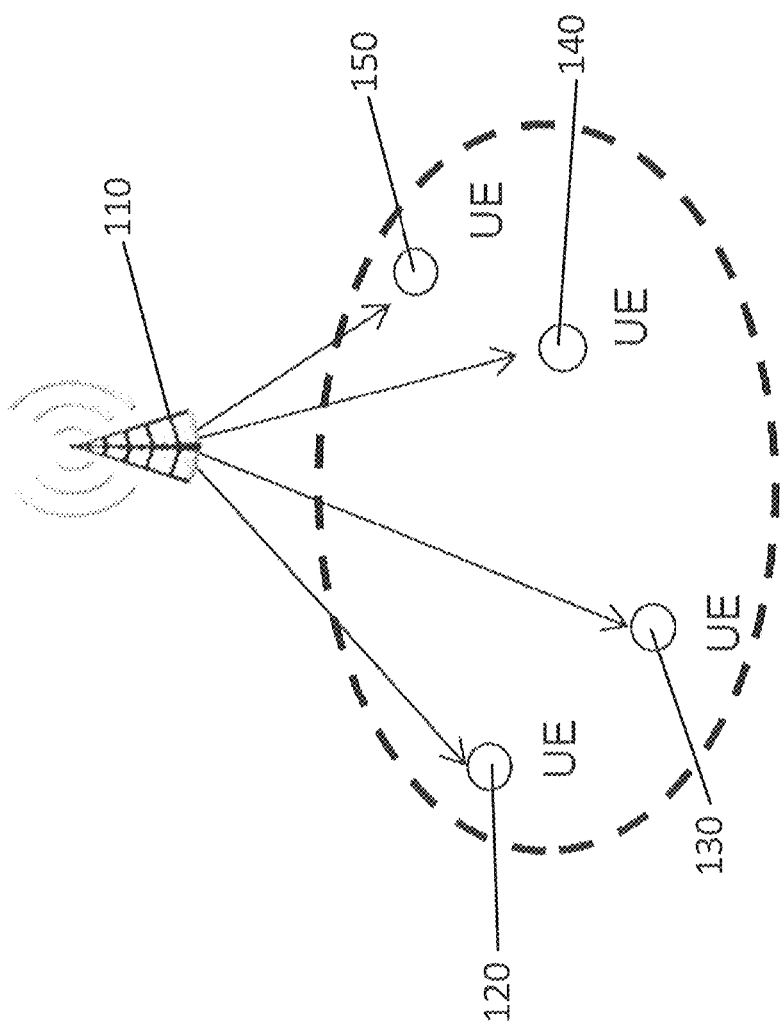
Figure 11:
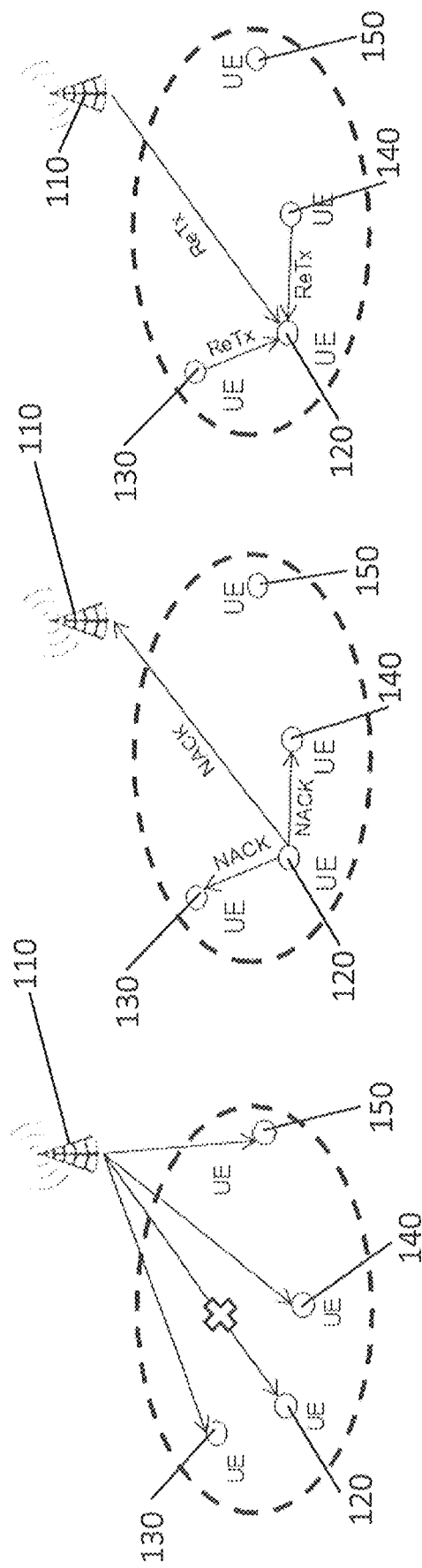

As mentioned in the summary above, the present disclosure presents mechanisms enabling fast, reliable and resource efficient retransmissions between a base station and one or a plurality of user equipment in a wireless communication network, such as but not limited to LTE networks, or future backward compatible networks to LTE. The following description comprises two general embodiments. The first embodiment is explained in relation to FIGS. 1 to 9 and refers to UL unicast data transmissions, e.g. data transmissions from a single user equipment 20 to a single base station 10 as schematically shown in FIG. 1. The second embodiment refers to DL multicast transmission of data from a base station 110 to a plurality of user equipment's 120, 130, 140 and 150 as schematically shown in FIG. 10. Hereby, the term "data transmission" refers to the transmission of content data, whereas the term "control data transmission" or "control data" refers to control data which refer to the transmission of any kind of administrative or signaling data necessary to control the (content) data transmission.

In the first embodiment explained below in relation to FIGS. 1 to 10, the mechanism refers to UL unicast transmission and specifically the core idea of a pre-allocation of UL retransmission resources and optional channel sensing. The considered general scenario as shown in FIG. 1, which schematically shows a unicast transmission of UL data content from a user equipment 20 to a base station 10.

Generally, in a network assisted wireless communication infrastructure, the allocation of resources for UL is coordinated by the BS 10. In a typical scenario, the BS 10 allocates resources (resources in this application refers to the time, frequency and/or spatial medium used to the transmission of content data, also called data content) on a for a unicast UL transmission.

The resource allocation information, i.e. the control data, could comprise information regarding the allocated resource blocks, the modulation encoding scheme, MCS, and the redundancy version, RV as in 3GPP TS 36.213. However, in order to reduce the delay for retransmission by waiting for resource allocation information, i.e. additional control data or information, in this proposal the BS 10 along with the resource allocation for the original transmission already pre-allocates the resources for the UL data retransmission and informs the UE 20 at the same time about the initial or original UL resource allocation as well as the resources for the retransmission of the data in case that the initial transmission fails. This is schematically visualized in FIG. 2, which schematically shows the proactive resource allocation, i.e. the allocation of initial UL resources as well as resources for UL retransmission of the same data at the same time and in the same control data from the BS 10 to the UE 20. One advantage of using such a proactive resource allocation is the flexibility of using the pre-allocated resources for the retransmission of the same data if the initial data transmission fails, or a new transmission of new data based on a decision if the initial data transmission has failed or not (ACK/NACK), which is explained further below.

For the retransmission of the same data, there is the possibility to pre-allocate sufficient more resources in order to increase the reliability of the retransmission as well as using a more robust modulation, such as binary pulse shift keying, BPSK, modulation, and a low rate coding scheme in order to reduce the probability of errors in the retransmission of the same data. This is schematically visualized in FIG. 2 where a larger resource block is allocated for the retransmission. There is also a possibility to reallocate these retransmission resources in a semi-persistent way. Semi-persistent allocation of retransmission resources means that the certain resources are pre-allocated for the UE 20 for a certain time duration just for retransmissions. This avoids the transmission of retransmission resource information or control information for every new data transmission.

Figure 3:
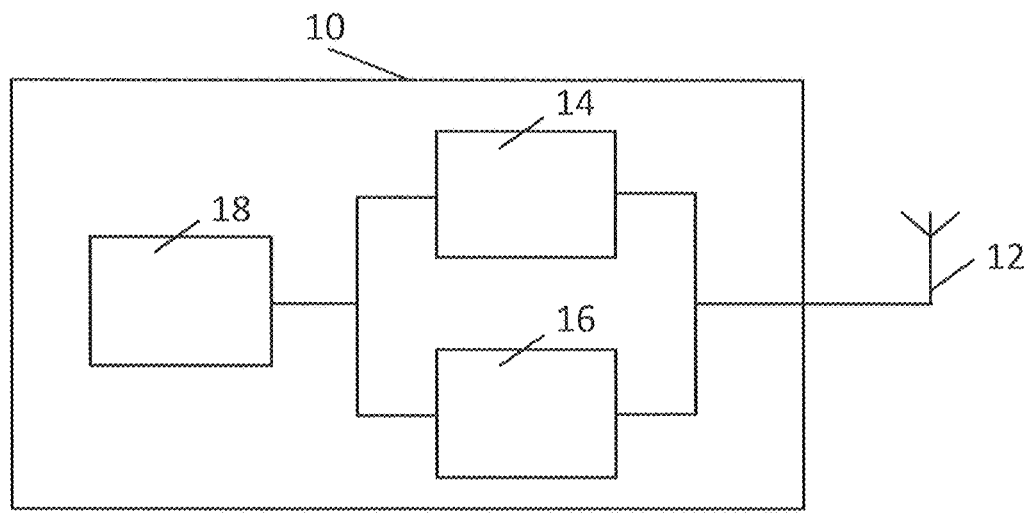
FIG. 3 shows a schematic block diagram of a base station, FIG. 4 schematically shows a schematic block diagram of a user equipment, FIG. 5 schematically shows channel sensing before transmission.

A general example of a base station 10 under this embodiment is shown in FIG. 3, where the base station 10 comprises an antenna 12, which is connected to a transmitting means 14 and a receiving means 16, which are both connected to a control means 18.

Figure 4:
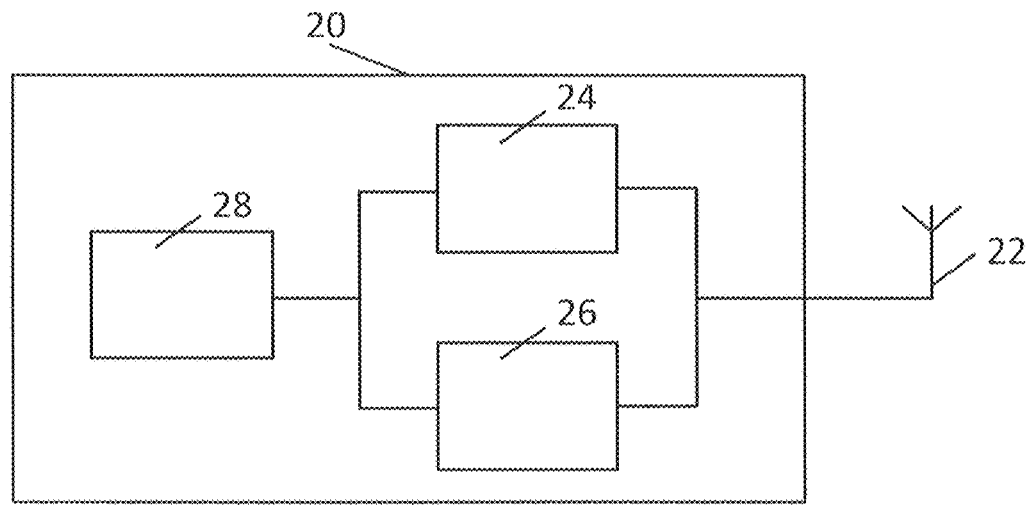

A user equipment 20 under the present embodiment is schematically shown in FIG. 4, where the user equipment 20 comprises an antenna 22, which is connected to a transmitting means 24 and a receiving means 26, which are both connected to a control means 28.

Once the resource allocation for original transmission and retransmission is received by the UE 20 via its antenna 22 and its receiving means 26, the UE 20 transmits, via its transmission means 24, to the BS 10 on the allocated resources for the initial transmission.

Upon receiving the data at the BS 10 via its antenna 12 and its receiving means 16, the BS 10 decodes the data in its control means 18. In case of unsuccessful decoding of data, the resources for the re-transmission are already pre-allocated and known both to the UE 20 and the BS 10 and the re-transmission of the same data occurs on the pre-allocated resources. However, in case of a successful decoding of the data, i.e. a successful receipt of the initial data transmission at the BA 10 and a successful decoding, the reserved pre-allocated resources are reused and re-allocated. Since the BS 10 coordinates resource allocation and knows the decoding status of UL data transmission, the reserves resources can be reallocated and utilized for other data transmissions. In this way, the resources which were initially allocated for the re-transmission can be efficiently utilized. The initially pre-allocated resources, which are re-allocated in case of a success of the initial data transmission can then be used for either a new UL or DL data transmission.

If the pre-allocated resources are utilized for a new DL data transmission the BS 10 coordinates the resource allocation and knows the status of the decoding of the initial data transmission, thus allowing it to re-allocate the resources for other transmissions without the need for additional signaling to inform the UE 20 about reallocation or successful decoding. If the pre-allocated resources need to be used for new UL transmissions, the BS 10 has to inform the UE 20 about the successful decoding of the initial data transmission via ACK or another suitable signaling or control message, so that the UE 20 knows the status of the decoding and receives a grant for the new transmission in the re-allocated resources. This is explained later below in relation to FIGS. 8 and 9.

Figure 5:
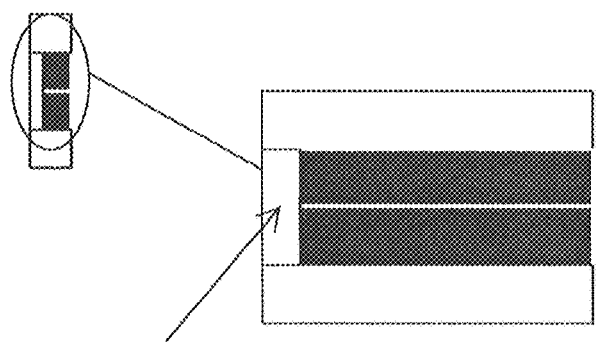

In addition, in order for the UE 20 to avoid waiting for ACK/NACK from the BS 10 for the UL transmitted data as well as to avoid collisions with other transmissions, from other UEs, on the same resources, a sensing mechanism is presented in the present disclosure. When the UE 20 intends to retransmit the data, it first senses the resources allocated for retransmission, i.e. the pre-allocated resources informed with the control data for the initial data transmission in order to determine if the resources are left unused or are being used for other data transmission by the BS 10 or another UE. This sensing is used as an alternative means for the UE 20 to detect ACK/NACK. If the decoding of the initial data was unsuccessful at the BS 10, the reserved resources are left unused, the energy on the reserved resources is low and the UE 20 detects this as NACK and understand that the data needs to be retransmitted. In case that the decoding of the initial data was successful at the BS 10 and the resources are used for other transmissions, the UE 20 senses the use of the resources by detecting some energy that could correspond to data transmissions or other predefined energy levels, and understands it has an ACK namely that the initial data was successfully transmitted. This sensing period is predefined depending on the detecting/sensing capability of the UE 20. Furthermore, if additional time is required for the BS 10 to coordinate the reuse of the retransmission resource, for example by transmitting control messages to other UEs for other UL transmission, the period should be extended accordingly, for example, by one symbol. FIG. 5 schematically shows the predefined sensing period for a resource block. Thus, with this mechanism the determining of ACK/NACK by the UE 20 is faster than actually receiving an ACK/NACK message from the BS 10.

Alternatively, an explicit ACK/NACK message can be transmitted from the BS 10 to the UE 20 instead of the sensing, whereby the ACK/NACK message informs the UE 20 if the initial data of transmission was successful or not. Even in the case of the sending of such an explicit ACK/NACK message, the overhead is reduced as only one bit is necessary to indicate the decoding status as for example in an adaptive HARQ scheme as known in the prior art. Instead of sensing the resource channel the UE 20 has to decode the ACK/NACK message explicitly in this case.

Figure 6:
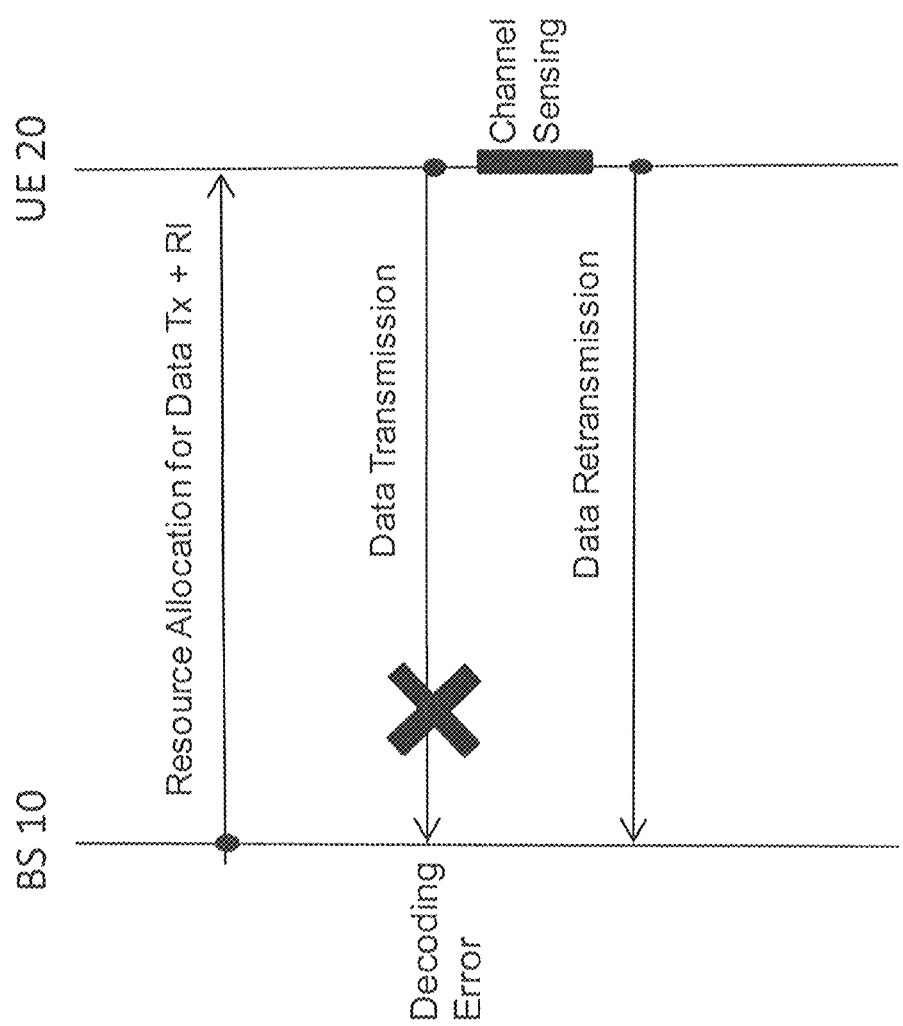
FIG. 6 shows a schematic flowchart in case of unsuccessful decoding.

FIG. 6 schematically shows a flowchart of the method's sequence for UL proactive retransmission in case of an unsuccessful decoding of the initial data transmission at the BS 10. In step 1, the BS 10 transmits the resource allocation information, which includes the allocated resource blocks as well as optionally the MCS, the RV and the RI. RI stands for retransmission indicator which contains the necessary resource allocation information, the maximum number of retransmissions and the MCS for the retransmissions. In step 2, the UE 20 performs the initial data transmission on the allocated resources. In step 3, the BS 10 unsuccessfully decodes the initial data. In step 4, the UE 20 performs a channel sensing for a predetermined time interval on the pre-allocated resources provided in the RI and determines NACK. In step 5, the UE 20 retransmits the same data on the allocated resources provided in the RI for the retransmission.

Figure 7:
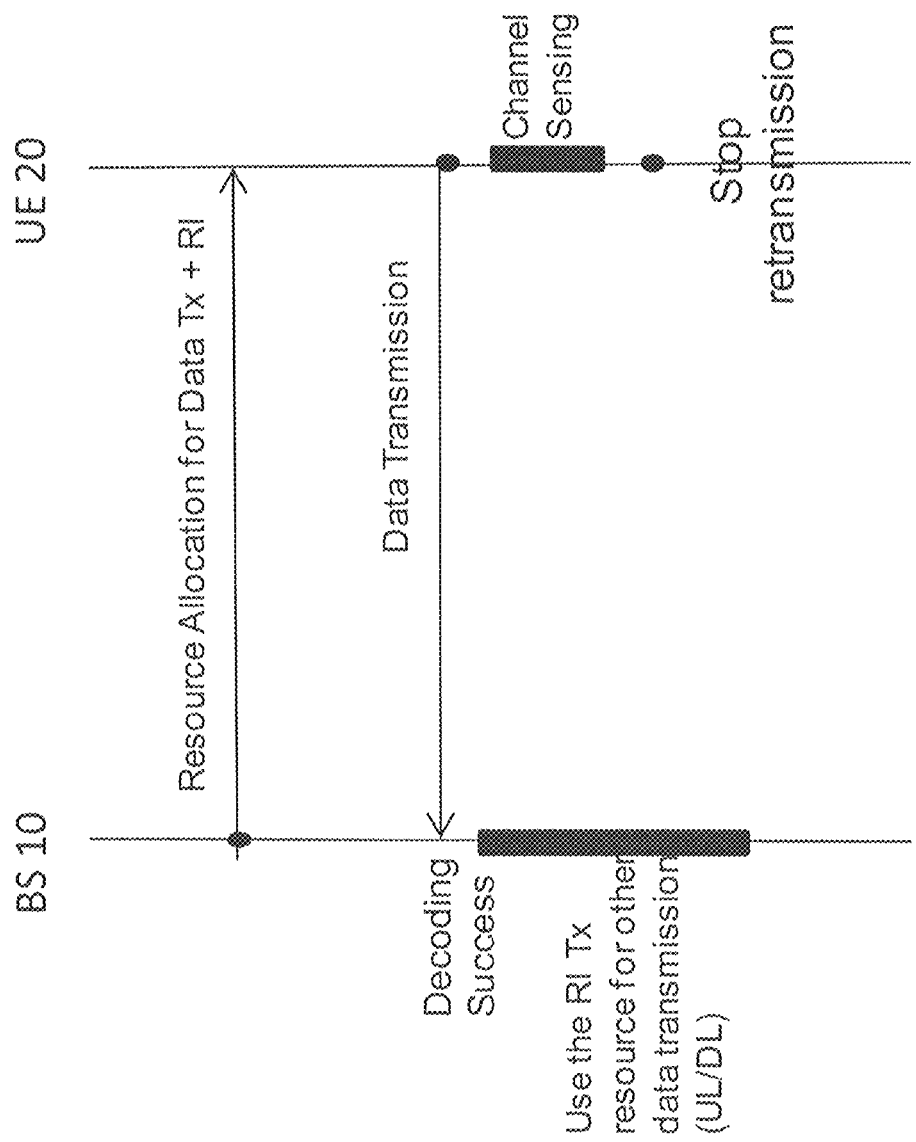
FIG. 7 shows a schematic flowchart in case of successful decoding.

FIG. 7 shows a schematic flow chart of the message sequence for a UL proactive retransmission in the case of a successful decoding of the initial data transmission at the BS 10. In step 1, the BS 10 transmits resource allocation information including the allocated resource blocks and optionally the MCS and the RV as well as the RI. The RI is the retransmission indicator which contains the necessary resource allocation information, the maximum number of retransmissions and the MCS for the retransmissions. In step 2, the UE 20 initially transmits the data on the allocated resources. In step 3, the initially transmitted data are successfully decoded at the BS 10. This means that the retransmission resources can be used for other data transmissions. In step 4, the UE 20 performs a channel sensing for a predetermined time interval, determines that the resources are in use, i.e. determines ACK, and does not perform the retransmission.

Figure 8:
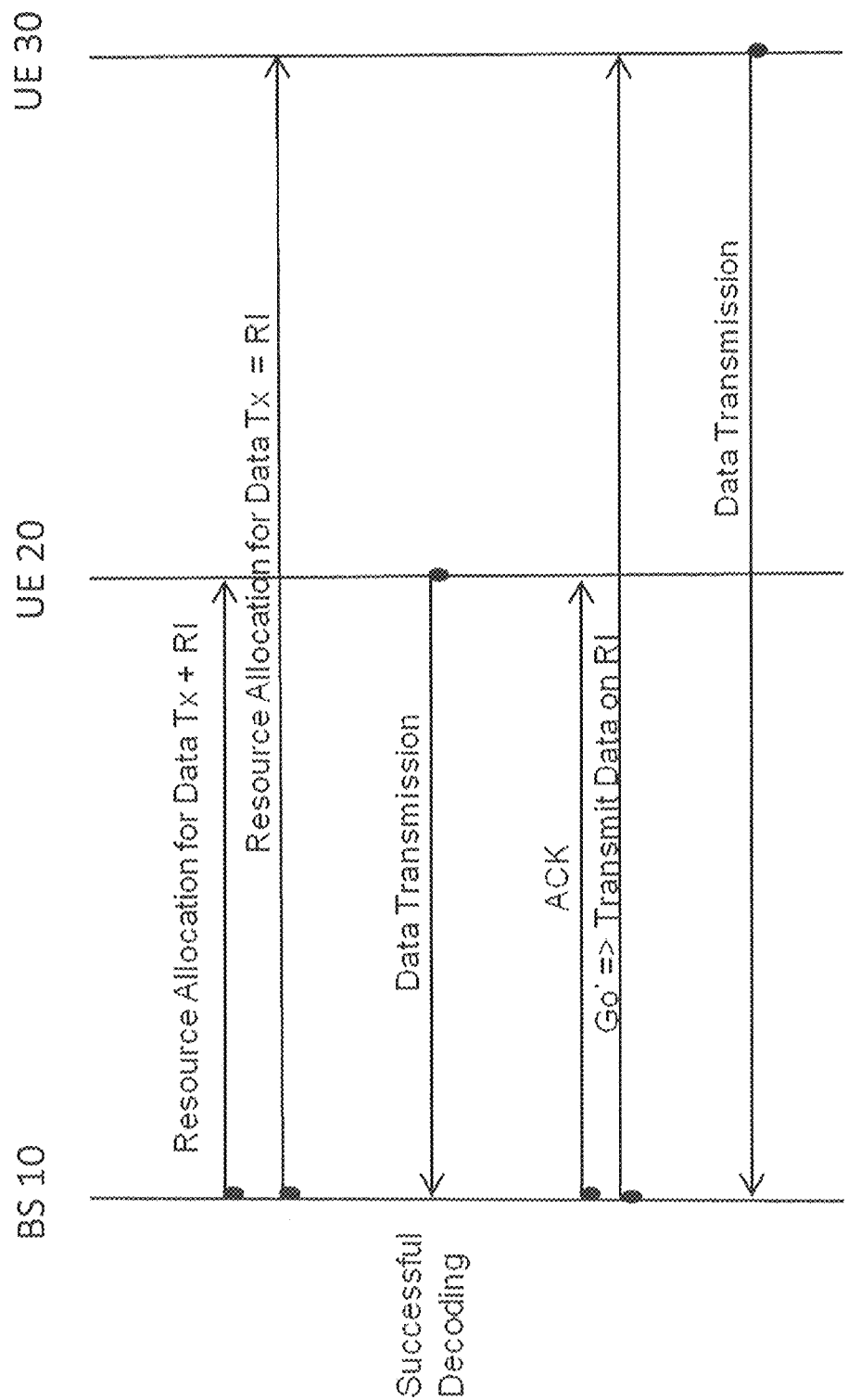
FIG. 8 shows a schematic flowchart for resource utilization with successful decoding.

FIG. 8 shows a schematic flowchart of a message sequence for UL proactive retransmission when the retransmission resources are used for new UL transmissions. The retransmission resources could hereby be used by the same (initial) UE 20 or a different UE 30. In case that a different UE 30 uses the retransmission resources, this needs to be informed to the UE 30. In the shown example, the BS 10, at the same time when informing the resources for the initial data transmission and the data retransmission to the initial UE 20, also informs the different UE 30 about the resources for the data transmission. As discussed above, the pre-allocated retransmission resources are used for a new data transmission only in case that the initial data transmission is successfully decoded at the BS 10. This involves extra signaling to inform the UE 20 or UE 30 about the status of the decoding at the BS 10 and the grant of a permission for using the retransmission resources. If the retransmission resources are to be used by the same UE 20, the ACK from the BS 10 could imply that the new data transmission can be sent on the resources which were initially allocated for the retransmission in the RI.

However, in case of an unsuccessful decoding of the initial data transmission of the BS 10, in order to avoid transmission of data from a different UE on the allocated retransmission resources, a NACK is transmitted from the BS 10 to the UE 20 to inform them that the initial data need to be retransmitted (for UE 20) and a "no go" message to the different UE 30 which had previously received the information about the data transmission on the retransmission resources. This is schematically shown in the flowchart of FIG. 9.

The advantages of the proactive UL retransmission described above in the first embodiment, as compared to prior art, are that the transmission of an explicit ACK/NACK message can be saved by using the sensing mechanism. Further, the retransmission delay can be reduced by saving the waiting time or receiving or decoding an explicit ACK/NACK message by the proactive allocation of resources. Also, the adaptive retransmission scheme can be implemented. A different frequency resource block can be pre-allocated and used for retransmission so that the spectrum diversity between the original transmission and retransmission can be explored. Alternatively, sufficient more resources can be pre-allocated for retransmissions so that the success rate of the retransmission can be guaranteed. The conventional PHICH can be applied without any change and a long decoding delay for retransmission indication can thus be avoided.

The second embodiment is described below in relation to FIGS. 10 to 14. The second embodiment is directed to a DL multicast scenario, e.g. a data transmission from a base station 110 to multiple user equipment 120, 1230, 140 and 150 as schematically shown in FIG. 10. In such a multicast case, the multiple UEs 120, 130, 140 and 150 receive the data from the BS 110 in a single multicast transmission. For example, in cases such as V2X when the intended recipients are generally all neighboring vehicles, such multicasting is a potential candidate as it is resource efficient. Current multicasting mechanisms do not support any reliability mechanisms such as HARQ.

The mechanism for DL multicasting of the second embodiment uses the same fundamental idea as described in the first embodiment for proactive UL retransmissions, namely the pre-allocation of retransmission resources. The considered scenario is a network assisted multicast with UEs 120, 130, 140 and 150 capable of downlink (between BS 110 and UE) and sidelink, SL, (between UEs) communication. In the second embodiment, within a single DL transmission, the BS 110 transmits multicast data to a group UEs 120, 130, 140, 150 and information about retransmission resources, that the UEs 120, 130, 140 and 150 respectively need to use for sidelink, SL, communication with each other and the BS 110 will use in the DL in case of any unsuccessful decoding.

Similar to the first embodiment, e.g. the UL proactive retransmission, sufficiently more resources can be allocated for retransmissions in order to improve its success rate. All the UEs 120, 130, 140, 150 are allocated the same sidelink SL retransmission resources and the same MCS. Such simultaneous retransmissions of the same content data from multiple resources is resource efficient and allows combining multiple copies of the same signals, e.g. the same content data at the destination thereby increasing the probability of successful decoding. The retransmission resource allocation for the BS 110 in the DL could either be the same or different as compared to the SL. In case that the same resources are allocated, the MCS must be identical for all retransmissions in order to avoid interference. In case that the BS 110 uses a different set of resources for each retransmission, the signal, e.g. MCS, could be different.

Figure 12:
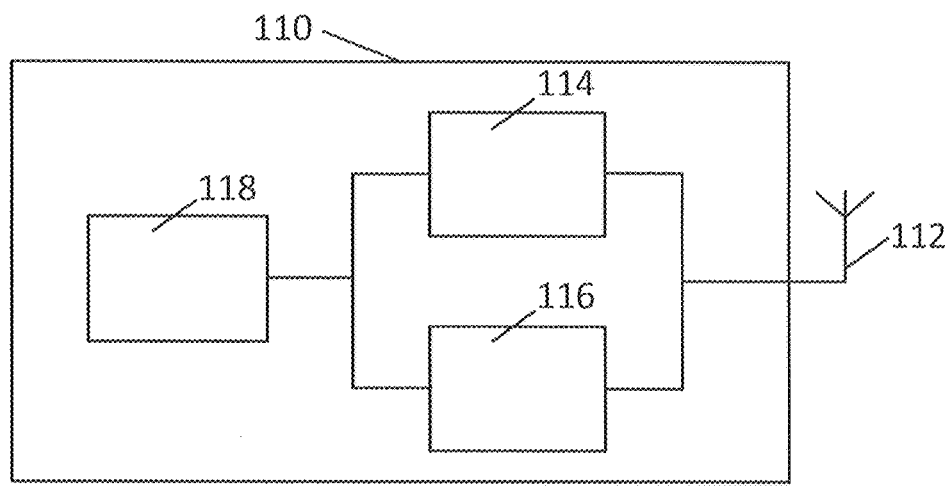
FIG. 12 shows a schematic block diagram of a base station.

FIG. 12 shows a schematic diagram of a base station 110 under the present embodiment. The base station 110 comprises an antenna 112 which is connected to a transmission means 114 and a receiving means 116, which are both connected to a control means 118.

Figure 13:
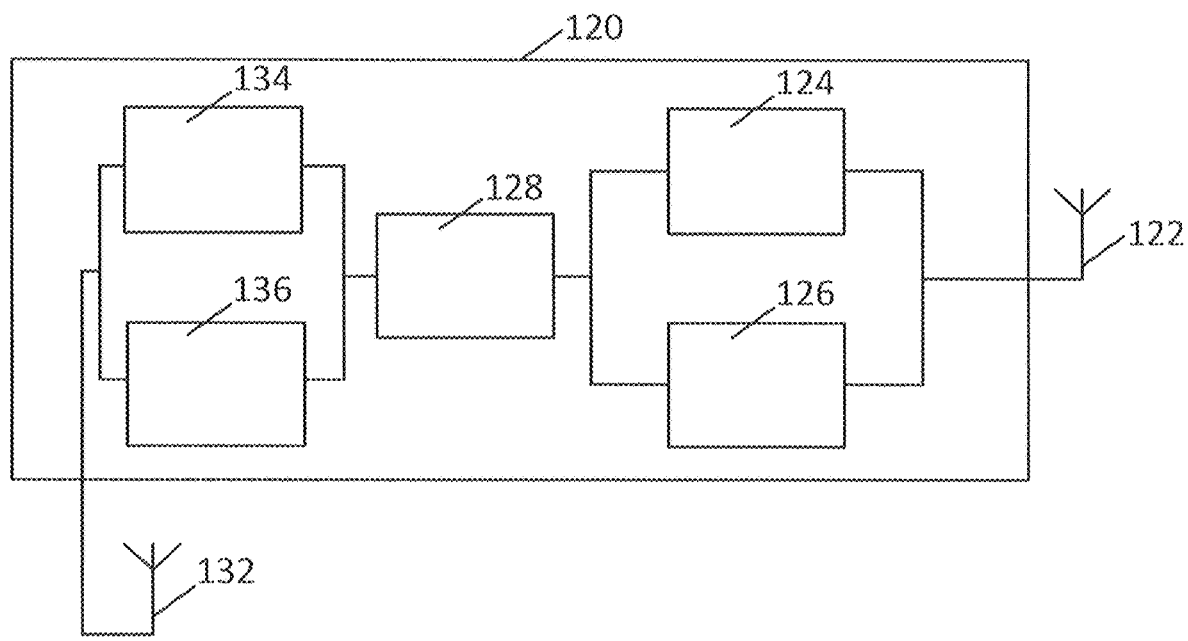
FIG. 13 shows a schematic block diagram of a user equipment.
Figure 14:
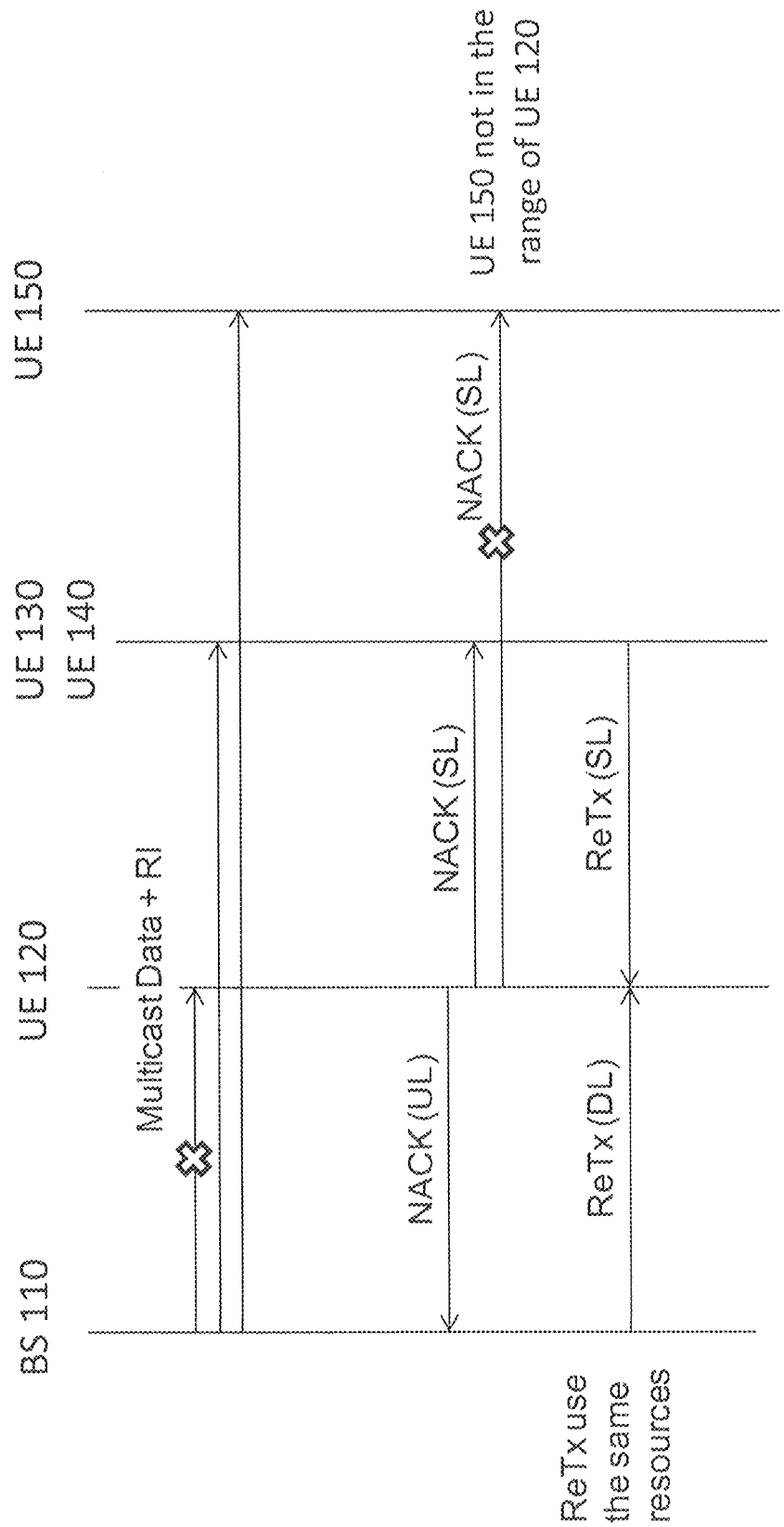
FIG. 14 shows a schematic flowchart for DL multicast retransmission.

FIG. 13 shows a schematic block diagram of a user equipment 120 under the present embodiment. The user equipment 120 comprises an antenna 122 which is connected to a transmission means 124 and a receiving means 126, which are both connected to a control means 128. The transmission means 124, the receiving means 126 and the antenna 122 are adapted for transmission and reception of wireless signals in a first wireless communication system with the base station 110. The user equipment 120 further comprises an antenna 132, which is connected to a transmitting means 134 and a receiving means 136, which are both also connected to the control means 128. The antenna 132 as well as the transmitting means 134 and the receiving means 136 are adapted to communicate in a second wireless communication system via sidelink SL, communication with the other user equipment 130, 140, 150. The antenna 132 and the transmitting means 134 and the receiving means 136 can be the same physical elements as the antenna 122, the transmitting means 124 and the receiving means 126, respectively, i.e. the same elements can be used for the UL, DL communication as well as the SL communications. Alternatively, the elements can be physically different elements. User equipment 130, 140 and 150 respectively have the same or similar structure as the user equipment 120.

The base station 110 corresponds for example to a base station for wireless communication according to the second aspect of the disclosure and its implementation examples as described in the above summary part. The user equipment 120 corresponds for example to a user equipment for wireless communication according to the fourth aspect of the disclosure and its implementation examples as described in the above summary part. Further, it is to be understood that the method for wireless communication according to the seventh aspect of the disclosure described in the summary part is performed by the base station 110. The method for wireless communication according to the ninth aspect described in the above summary part is performed by the user equipment 120.

The multicast DL transmission mechanism of the second embodiment is as follows. The BS 110 transmits multicast data and information about retransmission resources, i.e. SL ad DL resources, and optionally MCS and maximum number of retransmissions (and so forth) to the UEs 120, 130, 140 and 150 (FIG. 11a). The individual UE 120 among the multicast UEs, on receiving the initial data, decodes it and informs feedback information to the neighboring UEs 130, 140 and 150 and the base station 110 in case of an unsuccessful decoding, which is NACK. NACK is transmitted to the BS 110 via UL, and to the neighboring reachable UEs 130 and 140 via SL (FIG. 11b and FIG. 14)). The retransmissions are then triggered by the BS 110 and the UEs 130, 140 that have decoded the data successfully on the respectively informed retransmission resources, as shown in FIG. 11c. The retransmissions from the neighboring UEs 130, 140 occur by a SL communication. If the BS 110 received ACK from all the UEs 120, 130, 140, 150 of the multicast group, the pre-allocated resources are used for other transmissions, e.g. for UL or DL transmission between the BS 110 and one of the UEs 120, 130, 140, 150, or between the BS 110 and other UEs, or for SL transmission between any of the UEs. The mechanism for a pre-allocation of these pre-allocated resources to other UEs can be the same as the one described in relation to the first embodiment, especially in relation to FIGS. 8 and 9. This mechanism is adapted correspondingly into the second embodiment and the BS 110 and the US 120, 130, 140 and 150. Further, channel sensing can be performed by the UEs 120, 130, 140, 150 in the same way as by the UE 20 in the first embodiment (cf. FIGS. 6 and 7) to determine if the retransmission resources are used or unused by the BS 110 in order to determine the status of the multicast transmission.

The general advantages of the DL multicast retransmission mechanism described in the second embodiment are that retransmissions occur simultaneously from multiple resources, which improves the probability of a successful decoding. Further, retransmissions occur simultaneous on the same resources which improves the resource efficiency. Further, user equipments that have not received NACK do not retransmit the data, thus an interference is avoided. Further, reserving large resource blocks for retransmissions are not wasted in case of ACK, thus providing an efficient resource utilization.

The present disclosure has been described in consumption with various embodiments as examples as well as implementations. However, other variations can be understood and effected by those persons skilled in the art and practicing the claimed invention, from the studies of the drawings, the disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in different dependent claims does not indicate that a combination of these measures cannot be used in an advantageous implementation.

What is claimed is:

1. A base station (BS) for wireless communication comprising:
    a controller configured to generate control data comprising resource allocation information for initial data transmission and data re-transmission between the BS and a user equipment (UE), wherein the control data is for an uplink (UL) unicast transmission, and the resource allocation information comprises information on first UL resources allocated by the BS to the UE for an initial transmission of data from the UE to the BS, and on second UL resources allocated by the BS to the UE for a re-transmission of the data from the UE to the BS; and
    a transmitter configured to, in cooperation with the controller, transmit the control data to the UE or an additional UE and, in response to the initial transmission of data from the UE to the BS being successful, transmit a message to the UE or the additional UE that the second UL resources allocated for the re-transmission of data can be used for a data transmission between the UE or the additional UE and the BS.

2. A user equipment (UE) for wireless communication comprising:
    a controller;
    a receiver configured to receive, in coordination with the controller, from a base station (BS), control data comprising resource allocation information for initial data transmission and data re-transmission between the BS and the UE, wherein the control data is for an uplink (UL) unicast transmission, and the resource allocation information comprises information on first UL resources allocated by the BS to the UE for an initial transmission of data from the UE to the BS, and second UL resources allocated by the BS to the UE for a re-transmission of the data from the UE to the BS; and
    a transmitter configured to, in coordination with the controller, transmit the data to the BS in the first UL resources allocated for the initial transmission and re-transmit the data in the second UL resources allocated for the re-transmission in response to the initial transmission being not successful,
    wherein the controller is configured to detect that the initial transmission was successful by sensing that the second UL resources allocated by the BS for the re-transmission of the data are being used for another data transmission.

3. A method for wireless communication performed by a base station (BS), comprising:
    generating control data comprising resource allocation information for initial data transmission and data re-transmission between the BS and a user equipment (UE), wherein the control data is for an uplink (UL) unicast transmission, and the resource allocation information comprises information on first UL resources allocated by the BS to the UE for an initial transmission of data from the UE to the BS, and on second UL resources allocated by the BS to the UE for a re-transmission of the data from the UE to the BS;
    transmitting the control data to the UE or an additional UE; and
    in response to the initial transmission of data from the UE to the BS being successful, transmitting a message to the UE or the additional UE that the second UL resources allocated for the re-transmission of data can be used for a data transmission between the UE or the additional UE and the BS.

4. A method for wireless communication performed by a user equipment (UE), comprising:
    receiving, from a base station (BS), control data comprising resource allocation information for initial data transmission and data re-transmission between the BS and the UE, wherein the control data is for an uplink (UL) unicast transmission, and the resource allocation information comprises information on first UL resources allocated by the BS to the UE for an initial transmission of data from the UE to the BS, and on second UL resources allocated by the BS to the UE for a re-transmission of the data from the UE to the BS;
    initially transmitting the data to the BS in the first UL resources allocated for the initial transmission; and
    re-transmitting the data in the second UL resources allocated for the re-transmission in response to the initial transmission being not successful, wherein the initial transmission is detected as being successful by sensing that the second UL resources allocated by the BS for the re-transmission of the data are being used for another data transmission.

* * * * *